(12) United States Patent
Rosquist

(10) Patent No.: US 6,663,772 B2
(45) Date of Patent: Dec. 16, 2003

(54) OIL SKIMMING APPARATUS

(76) Inventor: Von D. Rosquist, P.O. Box 161, Levan, UT (US) 84639

( * ) Notice: Subject to any disclaimer, the term of this patent is extended or adjusted under 35 U.S.C. 154(b) by 19 days.

(21) Appl. No.: 09/967,527

(22) Filed: Oct. 1, 2001

(65) Prior Publication Data

US 2003/0062297 A1 Apr. 3, 2003

(51) Int. Cl.$^7$ .............................................. E02B 15/04
(52) U.S. Cl. .................... 210/242.3; 210/540; 210/923; 405/63
(58) Field of Search .............................. 210/170, 242.3, 210/540, 923; 405/63, 70

(56) References Cited

U.S. PATENT DOCUMENTS

| | | | | |
|---|---|---|---|---|
| 3,221,884 A | * | 12/1965 | Muller ..................... | 210/242.3 |
| 3,369,664 A | * | 2/1968 | Dahan ........................ | 210/923 |
| 3,565,254 A | * | 2/1971 | Latimer ...................... | 210/170 |
| 3,666,098 A | * | 5/1972 | Garland .................... | 210/242.3 |
| 4,104,884 A | * | 8/1978 | Preus ......................... | 210/923 |
| 4,207,191 A | * | 6/1980 | Webb ......................... | 405/63 |
| 4,752,393 A | * | 6/1988 | Meyers ..................... | 210/242.3 |
| 5,160,432 A | * | 11/1992 | Gattuso .................... | 210/242.3 |
| 5,169,526 A | * | 12/1992 | Gould ....................... | 210/242.3 |
| 5,423,986 A | * | 6/1995 | Valentin .................... | 210/540 |

* cited by examiner

*Primary Examiner*—Christopher Upton
(74) *Attorney, Agent, or Firm*—Angus C. Fox, III

(57) ABSTRACT

A system for recovering oil spilled on a body of water includes a buoyant containment boom of sufficient length to surround at least a portion of the spilled oil, the boom having a plurality of outer pipe sections, each outer pipe section being longitudinally perforated along one side that may be positioned against the spilled oil, a plurality of spaced-apart support members positioned within the outer pipe, and an inner pipe that is longitudinally perforated along one side, generally coextensive with the outer pipe, and rotatably positioned within said support members so that the perforations in the inner pipe sections may be positioned at a desired height within the outer pipe sections. The system also includes at least first and second suction pumps, the first pump acting to draw a water and oil mixture into the outer pipe, and the second pump acting to draw a mixture having a high percentage of oil into said inner pipe. Water is extracted from the mixture and the oil is stored.

20 Claims, 9 Drawing Sheets

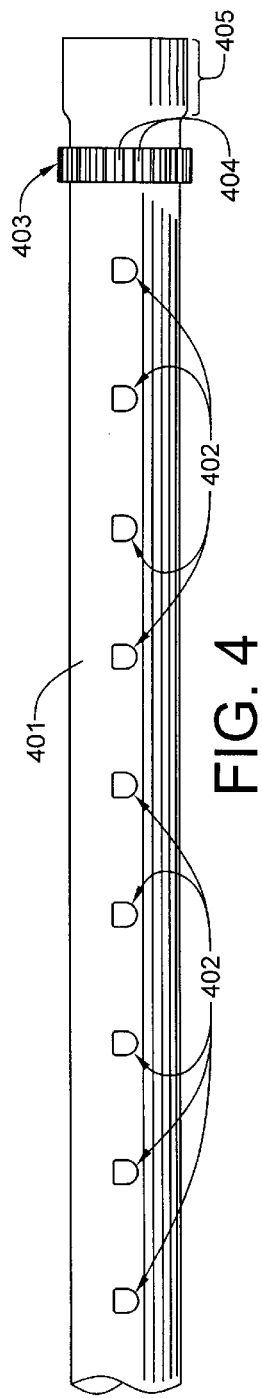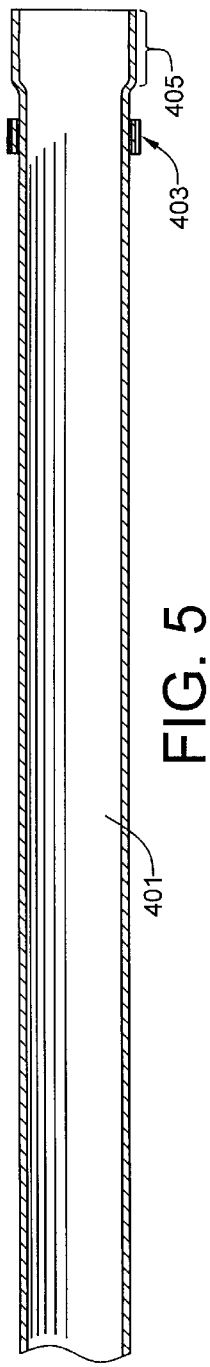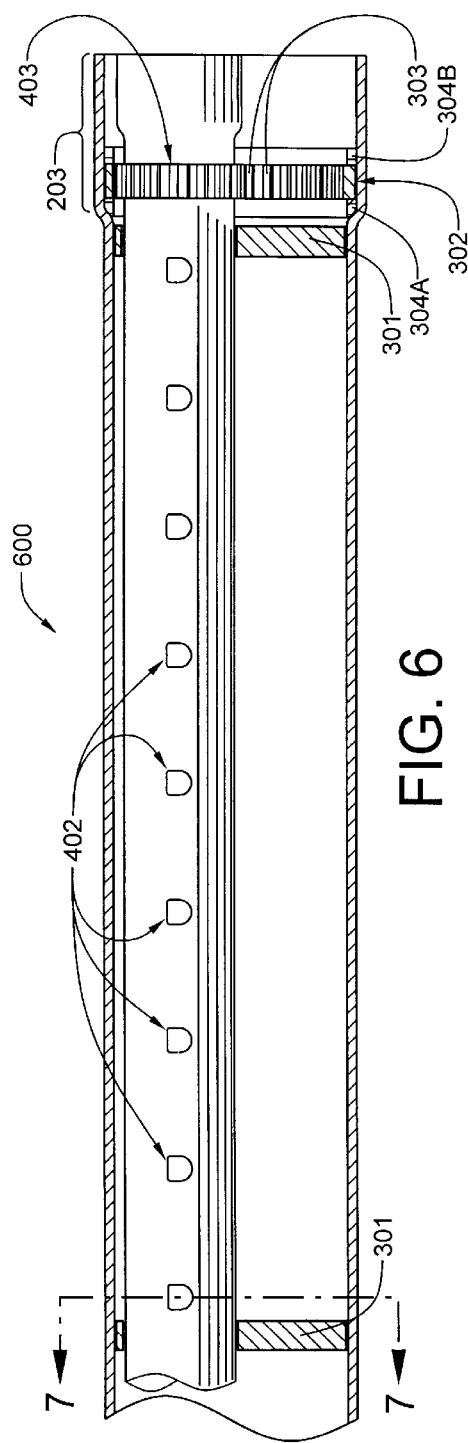

LOCATION B

OIL SKIMMING APPARATUS

BACKGROUND OF THE INVENTION

1. Field of the Invention

This invention relates to equipment for removing one layer of liquid floating on top of second layer of liquid, such as an oil or petroleum slick floating on a bodies of water, such as rivers, lakes, harbors, and even the open sea. More particularly, the invention relates to oil spill clean-up equipment which utilizes a floating barrier that is used to both surround the spill, or a portion of it, and remove oil from the spill at the surrounded edges thereof.

2. Description of the Prior Art

The Industrial Revolution, which began around 1750, created an almost insatiable demand for energy. In 1776, the same year that the American colonists declared independence from Great Britain, a Scottish engineer named James Watt designed an improved steam engine having a separate condenser, thereby eliminating the need to periodically cool the engine's cylinder. Though first used to drive mine pumps, Watt's steam engines soon found use in textile factories. From that time until the beginning of the twentieth century, the Industrial Revolution was powered primarily by steam engines fueled with coal. Around 1870, the internal combustion engine was developed. Lighter, more compact and more efficient than the steam engine, the internal combustion engine gradually displaced the steam engine which, in developed countries, had virtually disappeared from industrial use by 1960. Turbine engines came into wide use in the late 1950s as powerplants for both aircraft and electric generators. During World War II, the need for synthetic polymers to replace scarce naturally-occurring polymers such as natural rubber and silk spawned the rapid development of the petrochemical industry. At the beginning of the twenty-first century, the world is continuing to squander its petroleum reserves, from which most liquid fuels and most synthetic polymers are derived.

The profligate use of petroleum products is not without costs. There is increasing evidence that the global warming is largely attributable to the combustion of fossil fuels. In addition, the exploitation of petroleum reserves, which first requires exploration and drilling; later requires pumping, transportation, and refining of the crude; and finally requires transportation and marketing of the refined products, exacts its own environmental damage. The most serious environmental damage is almost certainly caused by the leakage of crude petroleum from tanker ships with damaged hulls and from broken pipes on offshore oil wells into the ocean. Super tanker ships capable of transporting several hundred thousand tons of crude petroleum are in widespread use and pose a serious threat to ocean environments. Leakage from broken pipes which transport crude petroleum across ecologically fragile regions on land can also create environmental havoc.

As the density of petroleum products is about eighty percent that of water, crude petroleum and petroleum products float on water. In the absence of an emulsifying agent, petroleum products are generally not miscible with water. These physical properties make possible the near complete recovery of petroleum products spilled onto bodies of water if the spill is rapidly contained, storms do not widely disperse the oil slick, and the spill occurs far enough from shore that it is not washed up on beaches before containment is effected. Without question, the more rapidly an oil spill can be contained, the greater the likelihood that the cleanup effort will be effective and environmental damage will be minimized. Thus, the speed with which an oil recovery system can be deployed is at least as important as its effectiveness in skimming the spilled oil from the body of water.

Much equipment has been developed for recovering layers of petroleum products floating on water. One such apparatus is disclosed in U.S. Pat. No. 3,221,884 to Jacques Muller. The apparatus includes a pair of parallel buoyant pipes, the first of which has inlets which admit water and oil mixture from an oil spill into the pipe, which conducts the mixture to suction pump on a ship, the second pipe having outlets to discharge water from which oil has been removed. The buoyant pipes are interconnected by a series of spaced-apart spacer bars, which support a third pipe used to provide ballast for the pair of buoyant pipes to that the inlets of the first buoyant pipe are positioned at a level that will admit primarily oil from the oil spill.

A floatable collar for confining oil spills is disclosed by U.S. Pat. No. 3,369,664 to Paul C. Dahan. The collar comprises an inflatable tube having a weighted skirt attached thereto below the inflatable tube and bulwark made semi-rigid by inflatable means located above the inflatable tube.

The oil slick confinement apparatus disclosed in U.S. Pat. No. 3,565,254 to John P. Latimer includes a vertically-oriented dam attached to a buoyancy member. A awning member, which extends the length of the dam, includes a floating lower edge which rides lightly on the spill side of the dam. The awning member also includes a air suction pipe which maintains pressure between the dam and awning at less than atmospheric. A floating oil collection pipe beneath the awning, which also extends the length of the dam, has inlets through which oil can be suctioned from the spill and transported to a ship or barge for collection.

Another apparatus for gathering a floating layer of oil from a body of water is disclosed by U.S. Pat. No. 3,584,462 to Phillip S. Gadd. An impermeable barrier is suspended within screened enclosure of U-shaped cross section. One embodiment of the apparatus employs a barrier suspended along both edges to form a trough through which oil might be transported to a collection location.

Another buoyant oil confinement boom is disclosed by U.S. Pat. No. 3,666,098 to Charles Garland, et al. The boom, which is primarily a floating pipe having perforations to receive oil from a spill, includes a suction pump coupled to one end thereof, and a skirt that is dependingly attached to the pipe so that it extends over the perforations without blocking them.

Yet another oil control boom is disclosed by U.S. Pat. No. 4,752,393 to Frank Meyers. This boom has walls which define an elongated hollow flotation chamber. Apertures in the walls of the chamber, admit oil, water, or a mixture of both into the chamber, from whence it is removed by a pump for removal of the oil.

An oil containment boom and skimmer is disclosed by U.S. Pat. No. 5,160,432 to Peter Gattuso. A first longitudinally extending tubular member is placed adjacent to the oil spill area. It includes an inner open area and inlets for receiving oil and water. A second longitudinally extending tubular member is placed parallel to the first member. A passageway with a lip connects the members and is placed slightly above sea level for skimming the upper layer of oil.

An oil spill containment and recovery system is disclosed by U.S. Pat. No. 5,533,832 to Howard Dugger. The system includes multiple containment float/recovery trough sections for collecting spilled petroleum from the water's surface.

The water and petroleum mixture is transferred from the collection trough by a pump to a separation tank.

SUMMARY OF THE INVENTION

The present invention provides an oil recovery system that includes a floating containment boom having an adjustable height internal oil skimmer for improved oil skimming efficiency. The boom is preferably of sufficient length to surround the spill, or a least a portion thereof. The boom includes an outer pipe that is longitudinally perforated on one side that is placed against a spill. The outer pipe is equipped with flotation devices, the buoyancy of at least one of which is adjustable. The adjustable buoyancy allows the boom to be floated at an optimum level. The boom also includes an inner pipe that is also longitudinally perforated on a single side, the inner pipe being generally coextensive with the outer pipe and rotatably positioned in support members within the outer pipe. Both the outer and inner pipe may be assembled from shorter sections joinable with couplings. The flotation devices may be incorporated into the couplings.

For a preferred embodiment of the invention, the outer and inner pipes are non-concentrically positioned with respect to one another, with inner pipe supports immovably positioned within the outer pipe. The supports position the inner pipe near the upper inner surface of the outer pipe and permit the inner pipe to be rotated so that the level of the perforations in the inner pipe may be adjusted within the chamber of the outer pipe. A minimum of two suction pumps are employed in conjunction with the boom: a first pump to draw a water and oil mixture into the outer pipe; a second pump to draw primarily oil into the inner pipe. The water and oil mixture removed from the outer pipe by the first pump is returned to the spill area. Oil mixed with some water withdrawn from the inner pipe by the second pump is sent to a separator located on a ship, barge or the shore. Oil is stored for subsequent use and the clean water separated therefrom is returned to a unpolluted area of the body of water.

In order to accurately adjust the level of the perforations on the inner pipe, the end thereof is equipped with an external circumferential straight-cut gear. A bell rotatable about the end of the outer pipe incorporates an internal circumferential straight-cut gear that meshes with the external gear on the inner pipe. As the bell is rotated about the outer pipe, the inner pipe also rotates. The bell may be equipped with stops to arrest its revolution about the outer pipe, thereby setting the inner pipe at a desired rotational position.

BRIEF DESCRIPTION OF THE DRAWINGS

FIG. 4 is a side-elevational view of a perforated inner pipe section of the oil containment boom;

FIG. 5 is a side-elevational cross-sectional view of the perforated inner pipe section of FIG. 4;

FIG. 6 is a side-elevational cross-sectional view of an assembled oil containment boom, which includes the outer perforated pipe of FIG. 3 with an inner perforated pipe installed therein;

DETAILED DESCRIPTION OF THE INVENTION

The oil recovery system of the present invention will now be described with reference to the accompanying drawing figures. It is to be understood that the drawings are not necessarily drawn to scale, but are merely intended to be illustrative of the system, its function and use.

Figure 1:
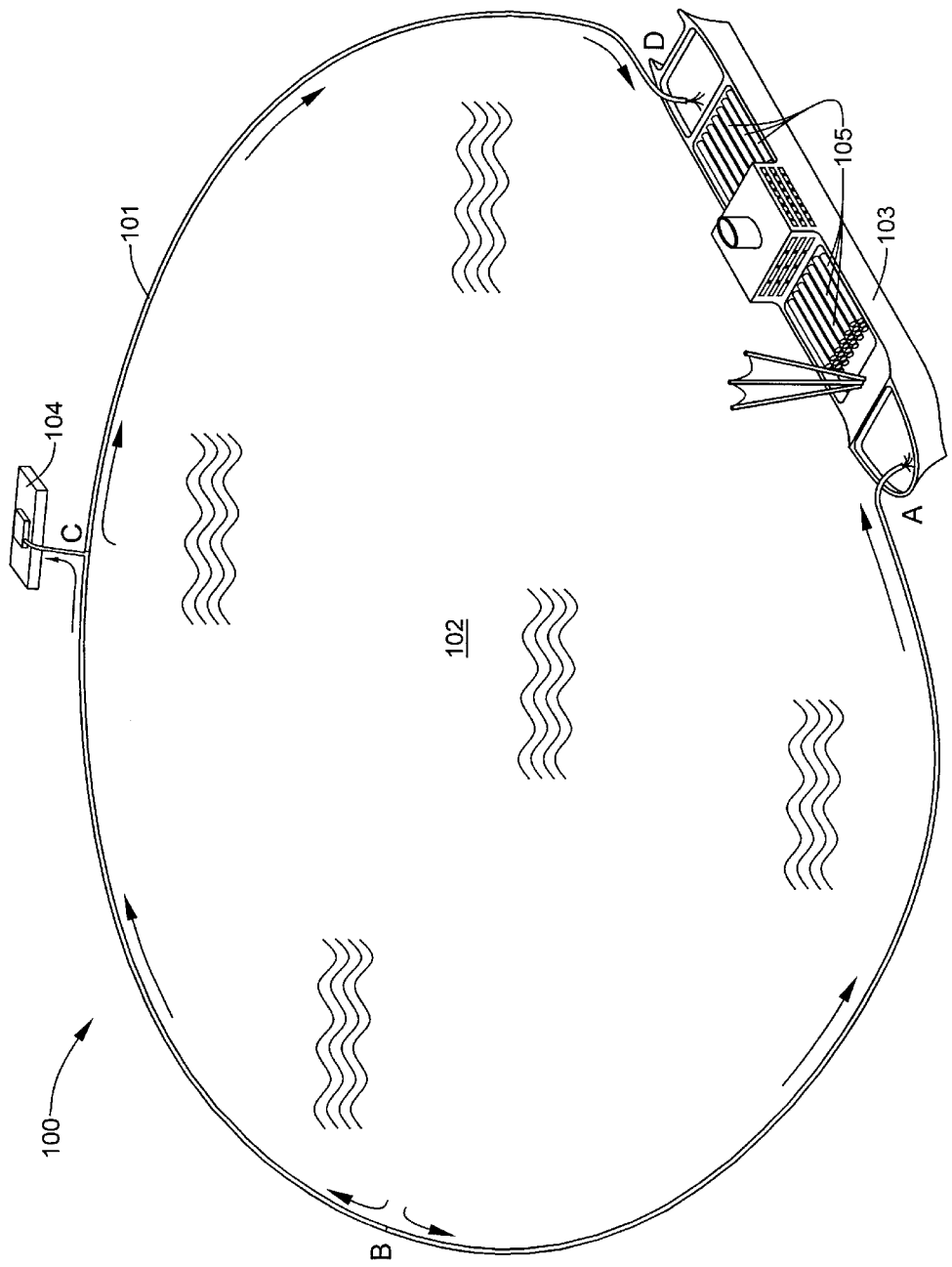
FIG. 1 is a aerial view of the oil recovery system of the present invention, being deployed in combination with the ship in the foreground.

Referring now to FIG. 1, the oil recovery system 100 includes a floating oil containment boom 101 that is used to surround at least a part of a floating oil slick 102. For proper operation of the system 100, suction pumps and a water-oil separator are required. These items may be located on a ship 103, a barge 104, on a derrick (not shown) or on the shore (also not shown). In this particular drawing figure, the boom 101 is divided into three sections AB, BC, and CD, each of which is capable of drawing oil from the slick 102. At locations A and D, oil is being recovered on the ship 103 from the boom sections AB and CD, respectively; at location C, oil is being recovered on the barge 104 from boom section BC.

Figure 2:
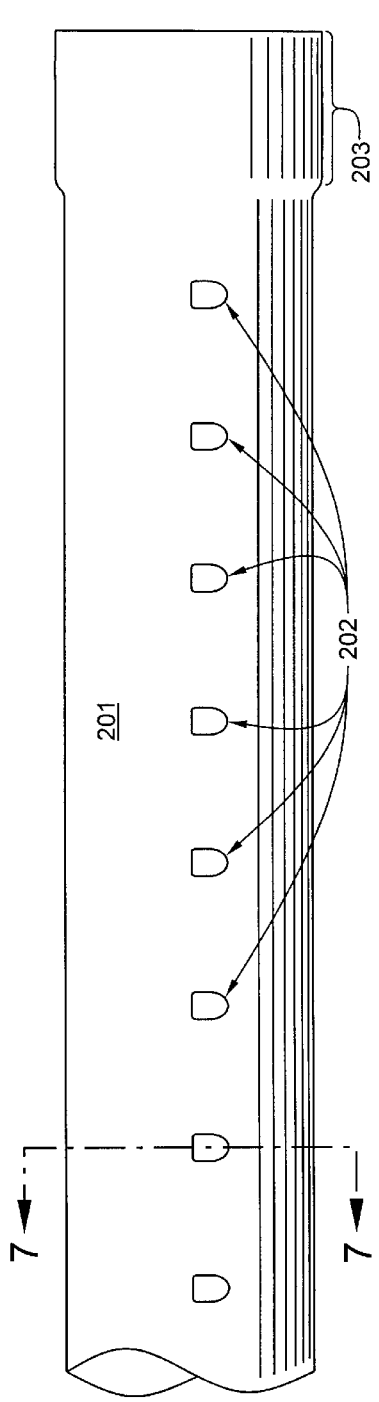
FIG. 2 is a side-elevational view of a portion of an oil containment boom section of the oil recovery system of the present invention.

Still referring to FIG. 1, it will be noted that the ship 103 has stored thereon multiple straight containment boom sections 105, which are preferably fabricated from a tough, lightweight plastic material, such as acrylonitrile butadiene styrene (ABS) or poly vinyl chloride (PVC). As the plastic material is somewhat flexible, the boom sections may be flexed slightly to form a curved structure so that the oil slick 102 may be surrounded by the boom 101. As the boom must act as a barrier against further spread of the oil slick 102, Referring now to FIG. 2, this exterior view of the oil containment boom 100 shows the outer pipe section 201, which has a plurality of apertures 202 along one side thereof, each aperture 202 communicating between the exterior of the pipe section 201 and the interior thereof. It will also be noted that each section 201 has an expanded end portion 203 which serves both as a coupling and as an enclosure for a first embodiment of an inner pipe rotational adjust mechanism (shown in later drawing figures).

Figure 3:
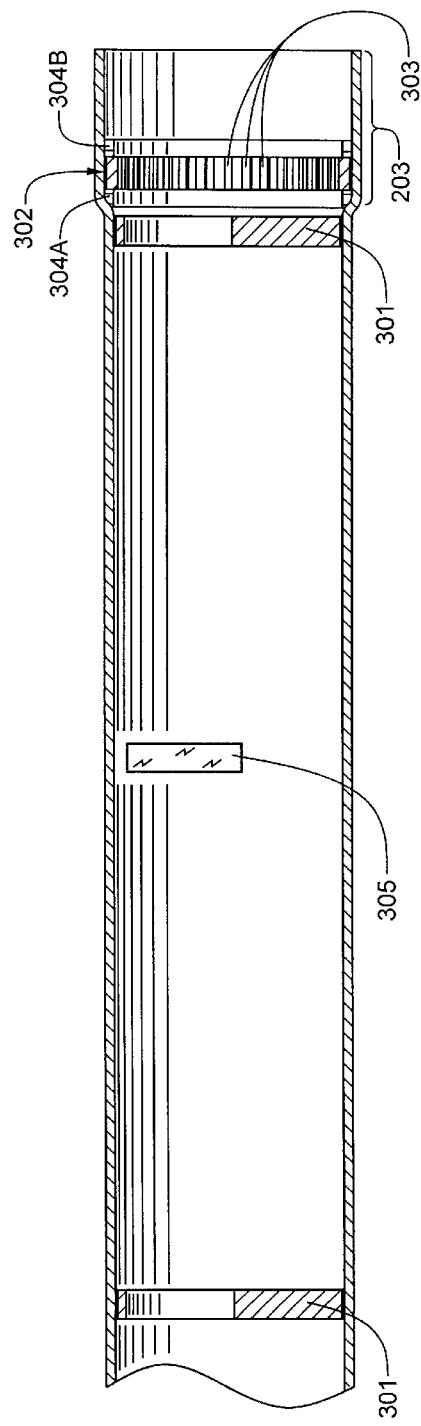
FIG. 3 is a side-elevational cross-sectional view of the oil containment boom of FIG. 2, taken through the axis thereof and with the inner pipe section thereof removed.

Referring now to FIG. 3, this cross-sectional view of an outer pipe section 201 shows a pair of supports 301, in which an inner pipe (not yet shown) is rotatably supported. Also visible in this drawing figure is an internal ring gear 302 rotatable within the expanded end portion 203, said ring gear having straight-cut teeth 303. The axis of the internal ring gear 302 is coaxial with the axis of the outer pipe section 201, and is caged between two positioning rings 304A and 304B, both of which are affixed to the interior surface of the expanded end portion 203. The outer pipe section 201 may also be equipped with an inspection window 305, which permits water and oil levels within the pipe to be viewed. Boom adjustments may then be made in accordance with the observed levels.

Referring now to FIG. 4, a portion of an inner pipe section 401 is sized for rotatable positioning within supports 301. The inner pipe section 401 also has a plurality of perforations 402 along one side thereof. Inner pipe section 401 is equipped with an external ring gear 403 that is permanently affixed to the exterior surface of inner pipe section 401. The axis of the external ring gear 403 is coaxial with the axis of the inner pipe section 401. The external ring gear 403 has straight-cut teeth 404, which engage the straight-cut teeth 303 of internal ring gear 302. It will be noted that each inner pipe section 401 has an expanded end portion 405, which serves as a coupling between adjacent inner pipe sections 401. FIG. 5 shows a cross-sectional view of the same portion of the inner pipe section 401.

Referring now to FIG. 6, this cross-sectional view of the fully assembled oil containment boom section 600 shows both the inner pipe section 401, the outer pipe section 201, the supports 301 in which the inner pipe section 401 is rotatably positioned, the rotatable internal ring gear 302, the teeth 303 of which are meshed with the teeth 404 of external ring gear 403.

Figure 7:
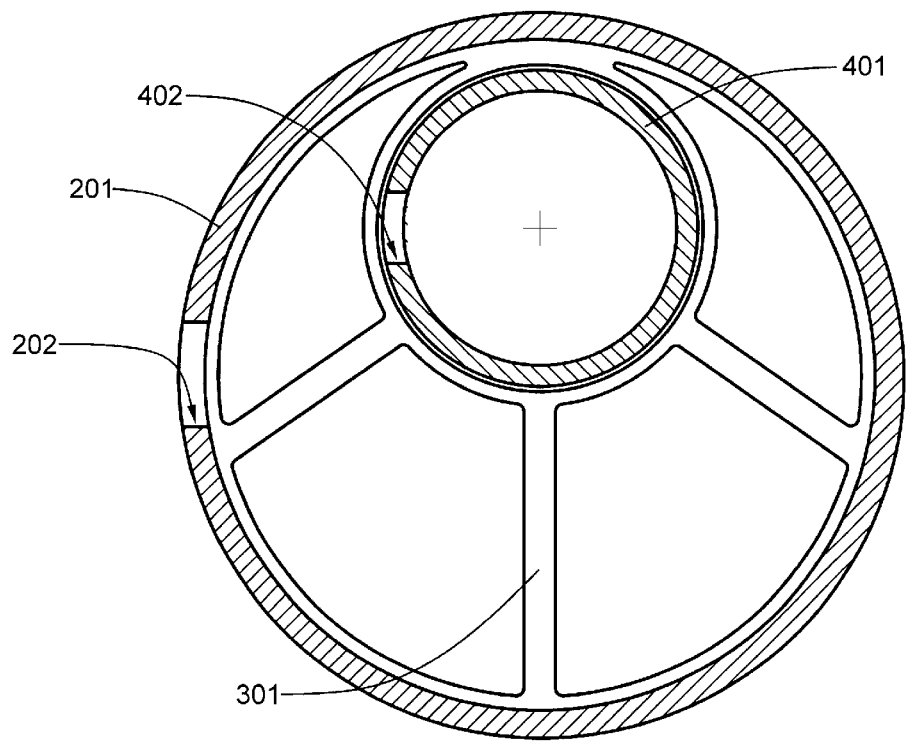
FIG. 7 is a cross-sectional view of a first embodiment oil containment boom of FIG. 2, taken through section line 7—7 of FIG. 2.

Referring now to FIG. 7, the structure of the support permits a water and oil mixture to flow through the outer pipe section 201, while still providing caged support for the inner pipe section 401. An aperture 202 within the outer pipe section 201 is visible in this view, as is an aperture 402 within the inner pipe section 401.

Figure 8:
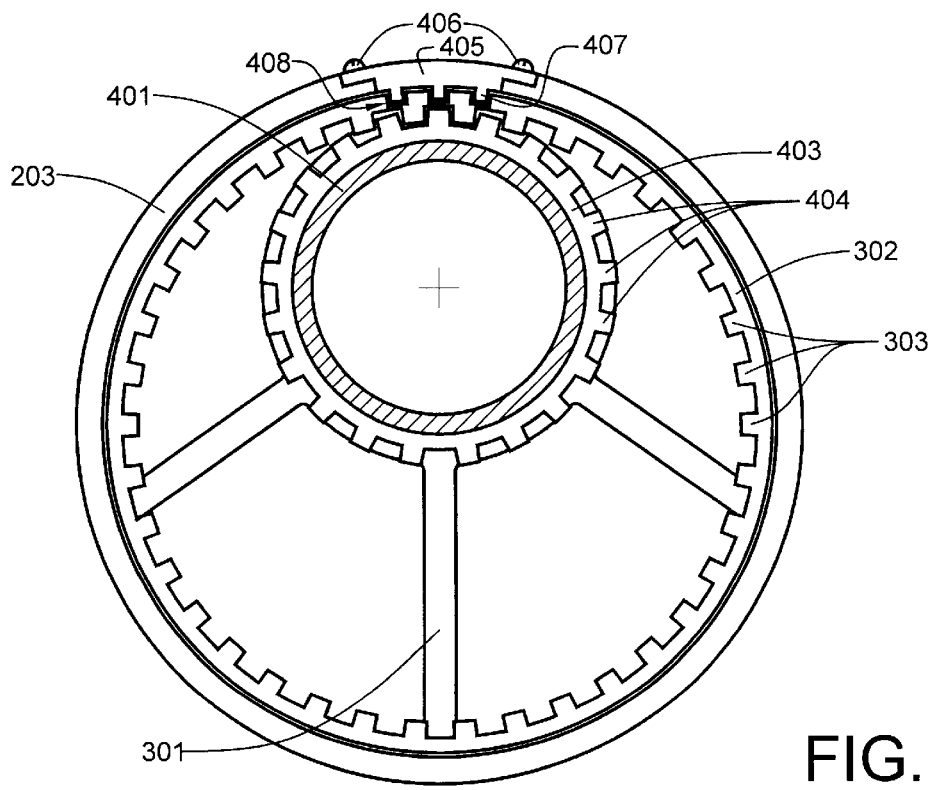
FIG. 8 is an elevational view of the right end of the oil containment boom of FIG. 2 showing a first embodiment rotational adjustment mechanism.

Referring now to FIG. 8, both the expanded end portion 203 of an outer pipe section 201 and an inner pipe section 401 are clearly visible, as are the internal ring gear 301 that is rotatably mounted within the expanded end portion 203, and the external ring gear 403 that is secured to the outer surface of the inner pipe section 401. It will be noted that teeth 303 on the internal ring gear engage teeth 404 of the external ring gear 403. Thus, when the internal ring gear 301 is rotated, it will cause the inner pipe section 401 to rotate. An adjustment cover 405 is held in place to the expanded end portion 203 by a pair of screws 406. The cover has at least one peg 407 that fits within indentations 408 on the internal ring gear 301. The indentations 408 may be used to rotate the internal ring gear 301 with a pointed object (not shown). When the cover 405 is installed, the adjusted position of the internal ring gear 301 will be retained.

Figure 9:
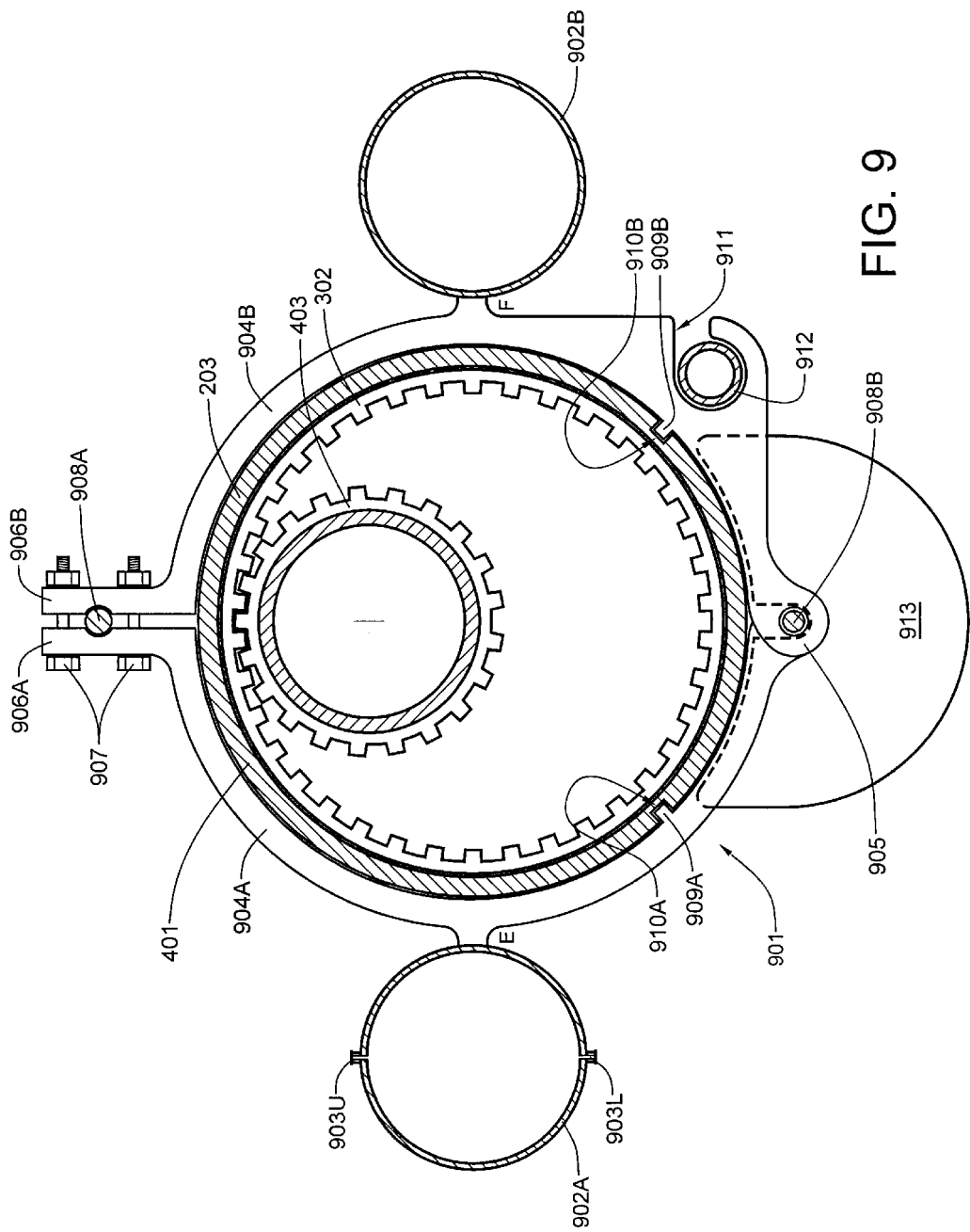
FIG. 9 is an end elevational view of the oil containment boom after having been fitted with an adjustable flotation device.

Referring now to FIG. 9, an adjustable flotation device 901 has been fitted to the expanded end portion 203 of an outer pipe section 201. The flotation device 901 has a pair of buoyancy chambers 902A and 902B. The buoyancy of chamber 902A is adjustable, while that of 902B is invariable. It will be noted that chamber 902A is equipped with upper and lower valves (903U and 903L, respectively), by means of which the buoyancy of the chamber 902A may be adjusted by either admitting or expelling fluid therefrom.

The two buoyancy chambers 902A and 902B are interconnected by a hinged bracket consisting of a first half 904A and a second half 904B, which are interconnected by a hinge 905. Buoyancy chamber 902A is attached to bracket half 904A at point E, while chamber 902B is attached to bracket half 904B at point F. Each bracket half 904A and 904B has an extension 906A and 906B, respectively. Using bolts 907, the extensions 906A and 906B may be securely clamped to retain a cable 908A, which ties together all of the interconnected pipe sections 201. The cable 908A is used to tie all of the pipe sections 201 together so that wave action and currents will not cause them to break. The bracket 904A/904B is fitted with a pair of locator pins 909A and 909B, while the outer pipe is fitted with a pair of locator holes 910A and 910B at each bracket mounting position. It should be obvious that the size of the chambers 902A and 902B should be sized for proper buoyancy. Their distance from the boom can also be increased to enhance stability in choppy water. It will be noted that the hinge 905 has an aperture through which a second cable 908B may be inserted. To avoid wear on the cable, a pair of mating, threaded, slotted-barrel grommets 1501/1504 shown in FIG. 15, may be used as a buffer. The cable 908B not only assists in tying together all of the pipe sections 201 together so that wave action and currents will not cause them to break, but it may also serve as the attachment point for an attachable flotation device 913, which may extend the length of the boom. Bracket 904A/904B also has a slot 911, within which a pressurized air hose 912 may be secured. Pressurized air carried by hose 912 may be used tor power pumps located at a distance from the ship 103. Flotation device 913 may be a shaped block of foam material and may be attached to the cable 908B with clips or other similar attachment means.

Figure 10:
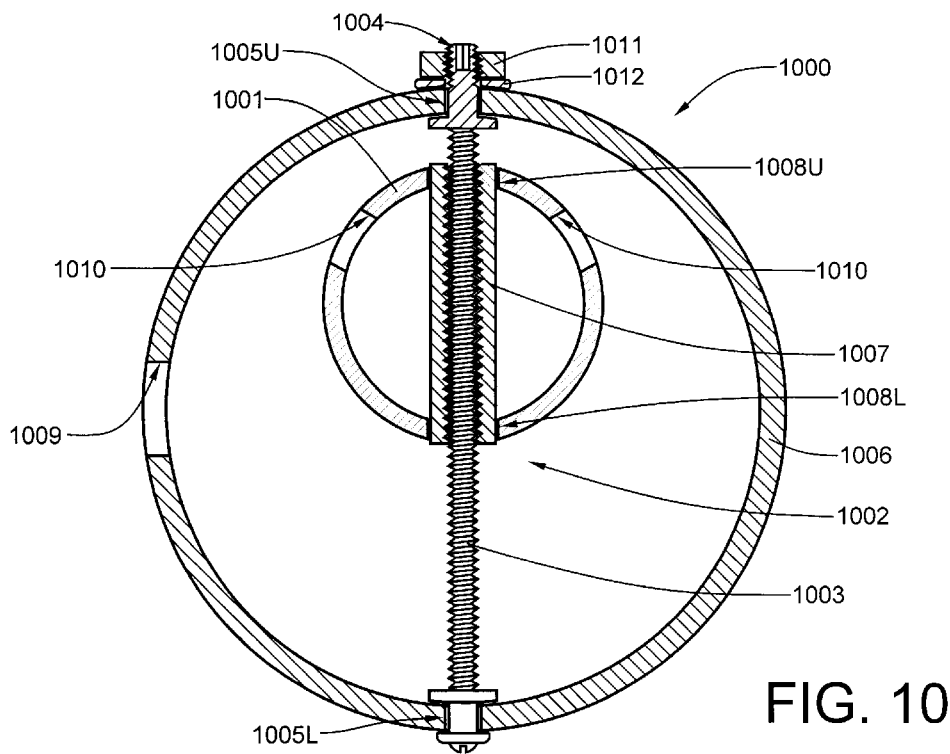
FIG. 10 is a cross-sectional view of a second embodiment oil containment boom having a combined support and height adjustment device.

Referring now to FIG. 10, a second embodiment of the oil containment boom 1000 incorporates both support and height adjustment of the inner pipe section 1001 in a single support/height-adjustment device 1002. A threaded shaft 1003, having a socket 1004 at one end thereof for engaging a wrench, is anchored within a pair of diametrically opposed apertures 1005U and 1005L in the walls of the outer pipe section 1006. The threaded shaft 1003 passes through a female threaded collar 1007 that is rigidly affixed with a pair of diametrically opposed apertures 1008U and 1008L in the walls of the inner pipe section 1002. As the shaft 1003 is rotated, the height of the threaded collar 1007 within the outer pipe section 1006 changes. It will be noted that for this second embodiment oil containment boom, the inner pipe section is perforated on both sides thereof, with the perforations 1009 being formed in the top half of the inner pipe section 1002. As the height of the inner pipe section is adjusted without rotating it, perforations may be placed on both sides of the inner pipe section 1002. A locknut 1010 serves to both seal the upper aperture 1005U in the outer pipe section 1006 and to lock the threaded shaft 1003 at a set position. It will be noted that the outer pipe section 1006 is perforated on only one side thereof. That side of the boom 1000 is placed against the oil slick 1002.

Figure 11:
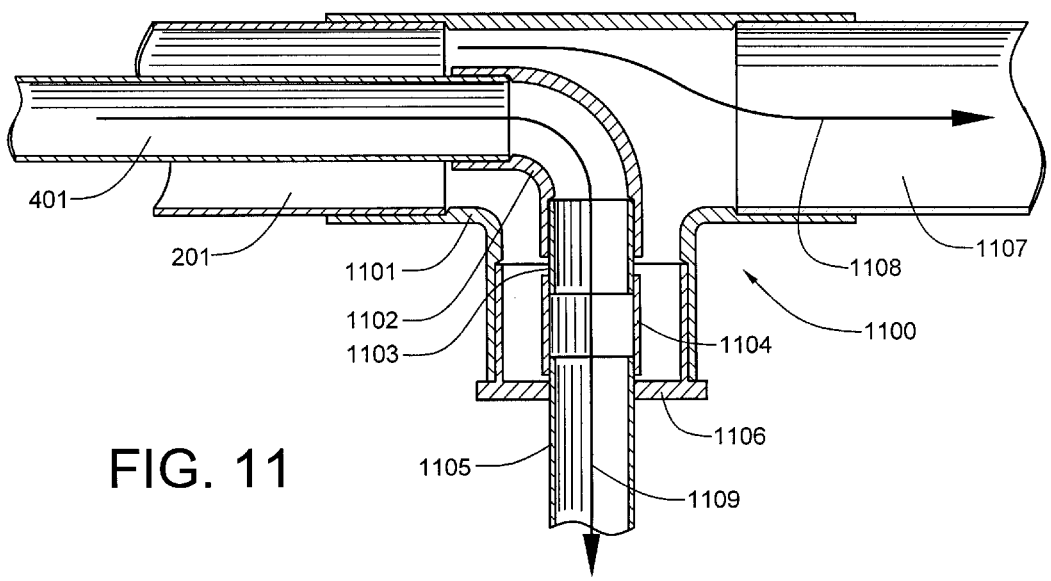
FIG. 11 is a cross-sectional view of a T-connector attachable to an end of the oil containment boom.

Referring now to FIG. 11, a female T-connector 1100 is employed at boom end locations A and D. The T-connector includes a main body 1101 having three female sockets 1102A, 1102B and 1102C, a 90-degree elbow 1103, a stub nipple section 1104 coupled to the elbow 1103, a flexible coupler 1105 coupled to both the stub nipple section 1104 and an inner exit pipe 1106. The exit pipe 1106 passes through a male plug 1107, which is used to cap one of female connector socket 1102B of the T-connector main body 1101. The flexible coupler 1105 permits the inner pipe sections

401 coupled to the elbow 1102 to be rotated or raised and lowered (depending on which support and height adjustment mechanisms are utilized). Also coupled to the main body 1101 is an outer exit pipe 1108, to which a first pump (See FIG. 14) is attachable. A water and oil mixture is withdrawn from the outer pipe section 201 that is coupled to female connection socket 1102A along path 1109, passing through the outer exit pipe 1108 that is coupled to female connection socket 1102C, then through the first pump, after which it is returned to the oil spill area 102. A primarily oil mixture containing some water and following path 1110, is withdrawn from inner pipe sections 401 through the elbow 1103, through the stub nipple 1104, through the flexible coupler 1105, through the inner exit pipe 1106, through a second suction pump, following which it is sent to a separator (see FIG. 14).

Figure 12:
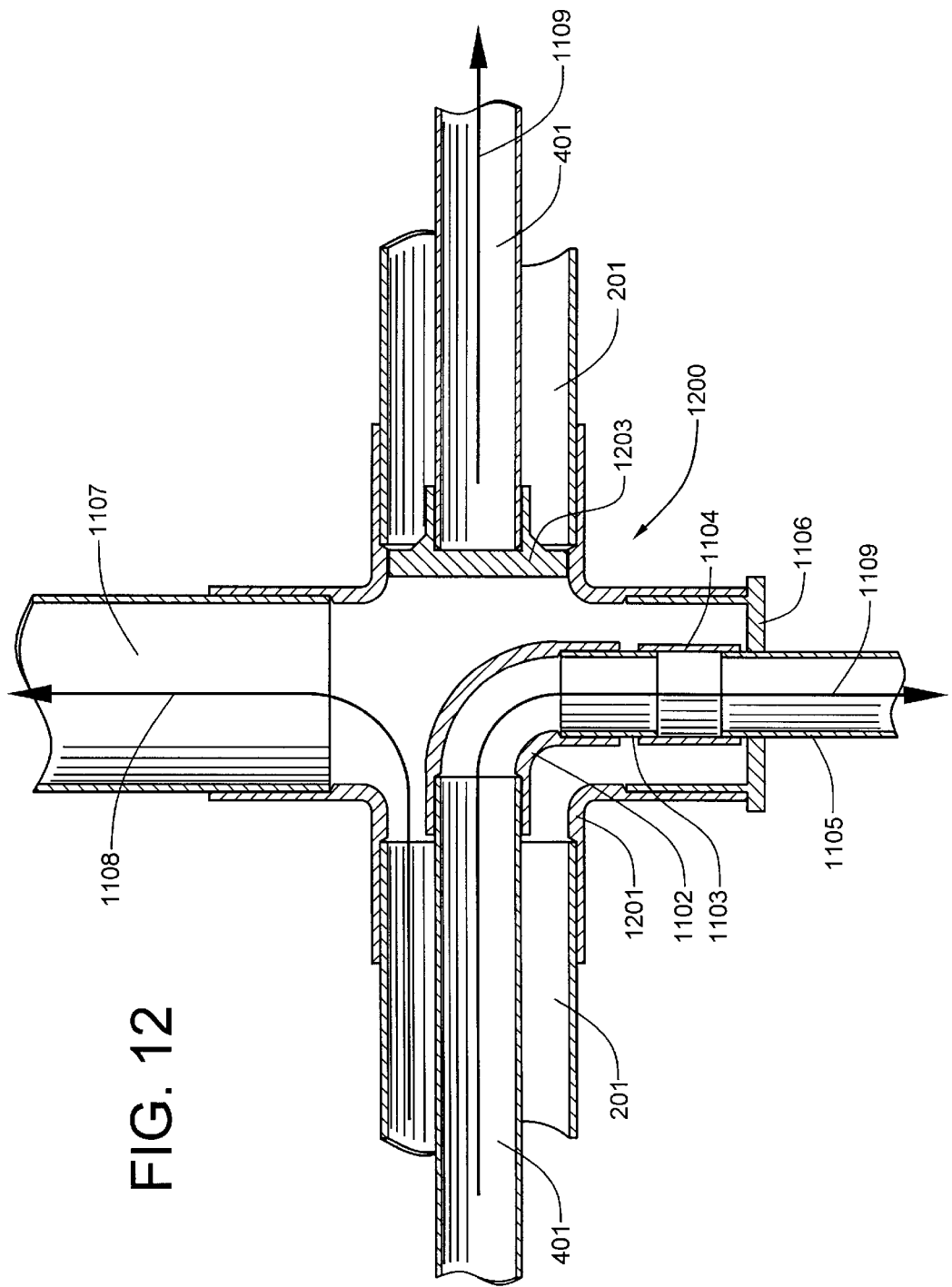
FIG. 12 is a cross-sectional view of a quad cross connector attachable between sections of the oil containment boom.

Referring now to FIG. 12, a quad cross connector 1200 is attachable between boom sections where a pumping station is to be established. For example, in FIG. 1, a quad cross connector 1200 would be positioned at location C in the boom 101. At location B, there is a block between two adjoining boom sections. Thus from location B, flow is bidirectional: toward locations A and C. The quad cross connector 1200 includes a main body 1201 having four female connection sockets 1202A, 1202B, 1202C and 1202D, a 90-degree elbow 1103, a stub nipple section 1104 coupled to the elbow 1103, a flexible coupler 1105 coupled to both the stub nipple section 1104 and an inner exit pipe 1106. The exit pipe 1106 passes through a male plug 1107, which is used to cap one female socket 1202B of the T-connector main body 1201. The flexible coupler 1105 permits the inner pipe sections 401 coupled to the elbow 1103 to be rotated or raised and lowered (depending on which support and height adjustment mechanisms are utilized). Outer pipe section 201 are inserted within female connector sockets 1202A and 1202C. A plug 1203 blocks the path through female connector socket 1202C and also provides a mounting socket for a new run of inner pipe sections 401. A water and oil mixture is withdrawn from the outer pipe section 201 that is coupled to female connection socket 1202A along path 1108, passes through the outer exit pipe 1107 that is coupled to female connection socket 1202D, then through the first pump (see FIG. 14), after which it is returned to the oil spill area 102. A primarily oil mixture containing some water and following path 1109, is withdrawn from the inner pipe sections 401 through the elbow 1103, through the stub nipple 1104, through the flexible coupler 1105, through the inner exit pipe 1106, through a second suction pump, following which it is sent to a separator (see FIG. 14).

Figure 13:
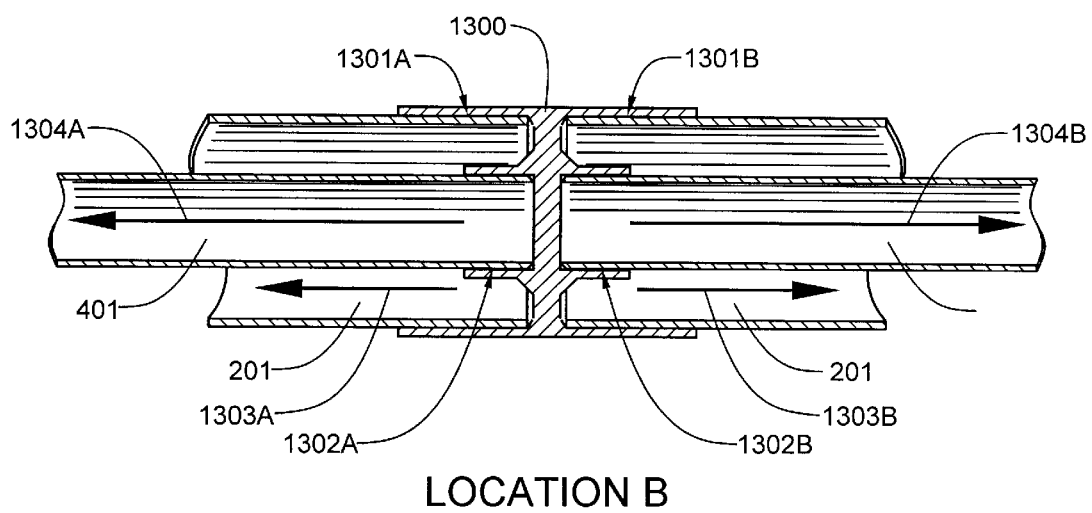
FIG. 13 is a cross-sectional view of a boom section separator coupling.

Referring now to FIG. 13, a boom section separator 1301 is shown coupled to two oil containment boom sections 600A and 600B, each of which comprises an outer pipe section 201 and an inner pipe section 401. Arrows 1303A and 1303B indicate the relative flow directions in each boom section of a water and oil mixture drawn from the oil spill. Arrows 1304A and 1304B indicate the relative flow directions of a primarily oil mixture in inner pipe sections 401. It will be noted that the boom section separator 1301 includes a pair of opposed sockets 1301A and 1301B, each of which is sized to receive an outer pipe section 201. It also includes a pair of opposed sockets 1302A and 1302B, each of which is sized to receive an inner pipe section 401. In the boom arrangement of FIG. 1, a boom section separator 1301 would be used at location B.

Figure 14:
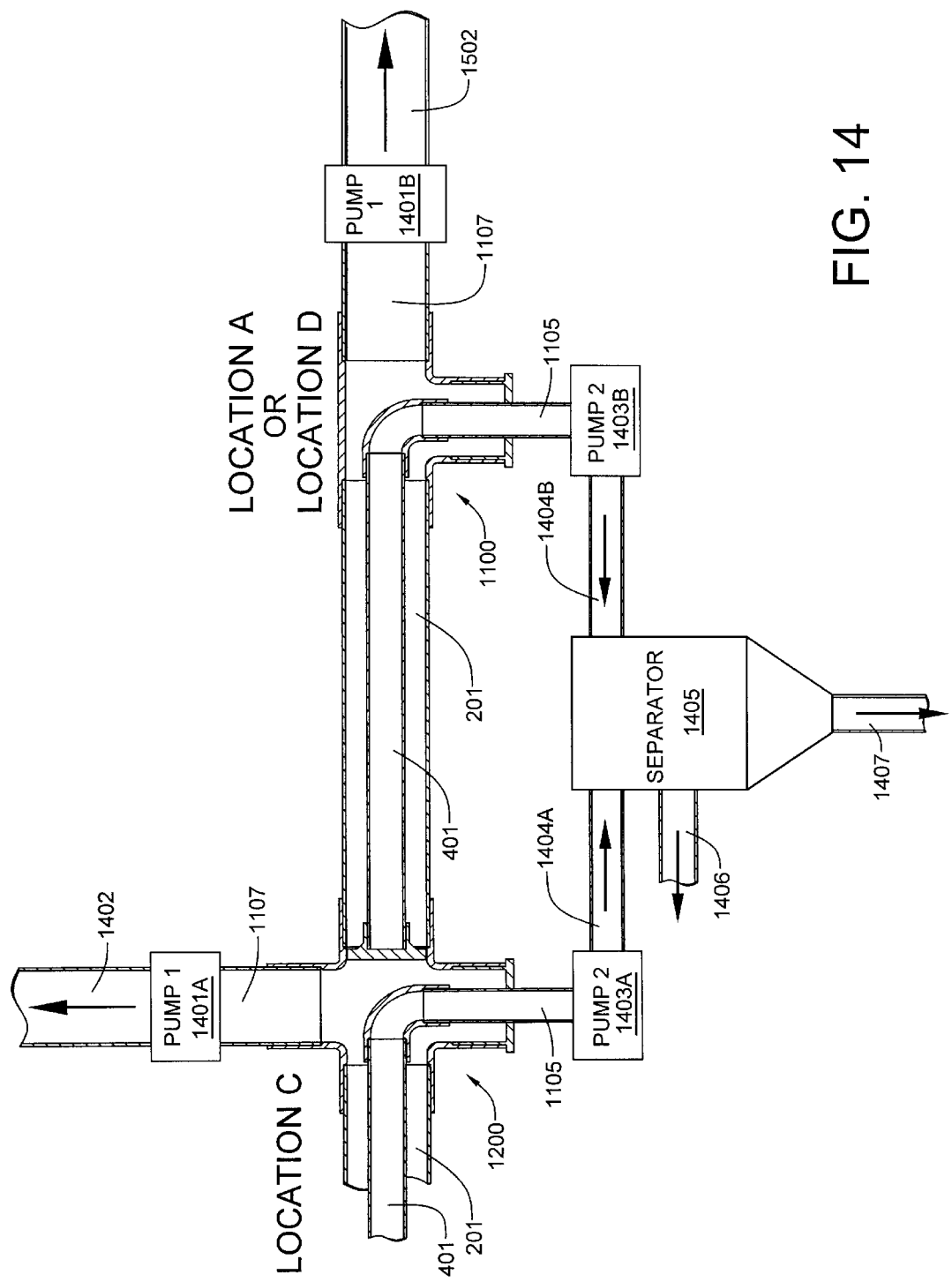
FIG. 14 is a schematic diagram of the boom, the pumps and the oil/water separator at locations A or D and C.

Referring now to schematic diagram of FIG. 14, plumbing connections, pump locations and fluid flows are shown for the sake of clarification. A first type suction pump 1401 is coupled to a stub pipe 1107 at both locations C and D. Each stub pipe provides a connection to the interior of a run of the outer pipe sections 201. Thus, each first type suction pump 1401 draws a mixture of water and oil from the outer pipe sections 201, which are continually being refilled through apertures 202. Through pipe connections 1402, the water and oil mixture is returned to the oil spill area 102. The boom separator 1401 (at location B) would be the start of the run of boom sections that are emptied at location C. The connection arrangement at location A would be identical to that at D. However, the boom separator 1401 (at location B) would be the start of the run of boom sections that are emptied at location A.

Still referring to FIG. 14, a second type suction pump is connected to each of inner exit pipe 1105, and the flow through 1404A and 1404B, respectively, directed to a separator 1405. The inner pipe sections are being continually refilled from the water and oil mixture in the outer pipe sections 201 through perforations 402. Oil from the separator is removed through pipe 206 and stored, while water taken from the mixture through pipe 1407 is sent to open (unpolluted) water outside the spill area. It should be mentioned that because location C and D will be typically far removed from one another, a separate separator 1405 will be required at each location. The drawing merely depicts the flow diagram. As shown in FIG. 1, the separator 1405 may be an integral part of the spill clean-up ship 103.

Figure 15:
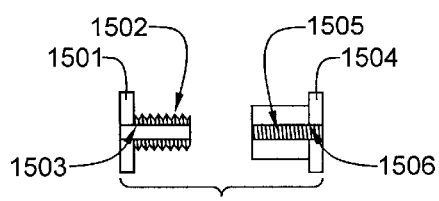
FIG. 15 is a side elevational view of a pair of mating grommets used to anchor a cable to the oil containment boom.

Referring now to FIG. 15, the cable 908B may be protected against abrasion by the pivot aperture of hinge 905 with a pair of mating threaded, slotted-barrel grommets 1501 and 1504. The first grommet 1501 is configured with male threads 1502 and a slot 1503, which slips over the cable 908B. The second grommet 1504 is configured with female threads 1505 and a slot 1506 which slips over the cable. The male end adjuster is similar to the slotted barrel end adjusters used on bicycle and motorcycle brake levers. When the slots are unaligned with respect to each other, the cable is secured within the mated grommets, which may be tightened against opposite sides of bracket hinge 905.

Although only several embodiments of the invention has been heretofore described, it will be obvious to those having ordinary skill in the art that changes and modifications may be made thereto without departing from the scope and the spirit of the invention as hereinafter claimed.

What is claimed is:

1. A system for recovering a layer of oil floating on a body of water, said system including a buoyant containment boom of sufficient length to surround at least a portion of the floating oil, said boom comprising:
   a plurality of outer pipe sections sealably joined end to end, each section longitudinally perforated along one side that may be positioned against the floating oil;
   a plurality of spaced-apart support members positioned within the outer pipe; and
   a plurality of inner pipe sections sealably joined end to end, each section longitudinally perforated along at least one side thereof, generally coextensive with the outer pipe, and positioned by said support members so that the perforations in the inner pipe sections may be adjustably positioned at a desired height within the outer pipe sections.

2. The system of claim 1, wherein said supports position the inner pipe sections are supported so the axis of each is displaced upwardly from the axis of the outer pipe sections.

3. The system of claim 2, wherein each inner pipe section is equipped with an external, at least partially circumferential gear that is coaxial therewith, and each outer pipe section is equipped with an expanded end section, said end section incorporating an internal at least partially circumferential gear that is coaxial with the outer pipe section, and meshes with the external gear on the inner pipe, so that as the internal gear is rotated within the expanded end section, the inner pipe also rotates.

4. The system of claim 3, wherein rotation of the internal gear is arrestable so that the inner pipe section can be set to a desired rotational position.

5. The system of claim 1, which further comprises at least first and second suction pumps, said first pump acting to draw a water and oil mixture into the outer pipe, and said second pump acting to draw primarily oil into said inner pipe.

6. The system of claim 5, which further comprises a separator into which primarily oil drawn from said inner pipe sections is sent, said separator having at least one exit pipe through which water is removed from the oil and routed to a relatively unpolluted area of the body of water.

7. The system of claim 6, wherein the separator is an integral part of a clean-up ship.

8. The system of claim 5, wherein the water and oil mixture removed from the outer pipe by the first pump is returned to an area of the body of water where oil is yet to be recovered.

9. The system of claim 5, wherein the perforations in the outer pipe are evenly spaced, but of increasing size as their distance from the first pump increases, distance being measured along the joined outer pipe sections.

10. The apparatus of claim 1, wherein each support member is a threaded shaft installed in diametrically opposed apertures within the outer pipe section and passing through diametrically opposed apertures and a threaded collar within the inner pipe section, the threads of said collar engaging those of said shaft, said shaft being rotatable to raise and lower the inner pipe section.

11. The system of claim 1, wherein buoyancy of the boom is adjustable.

12. An apparatus for skimming and recovering a layer of oil floating on a body of water, said apparatus comprising:
   a plurality of outer pipe sections sealably joined end to end, each section longitudinally perforated along one side that may be positioned against the floating oil, said plurality of joined outer pipe sections being of sufficient length to at least partially surround the layer of oil;
   a plurality of spaced-apart support members positioned within the outer pipe sections;
   a plurality of inner pipe sections sealably joined end to end, each section longitudinally perforated along at least one side, said plurality of inner pipe sections being generally coextensive with the joined outer pipe sections, and positioned within said support members so that the perforations in the inner pipe sections may be positioned at a desired height within the outer pipe sections;
   a plurality of adjustable buoyancy floats attached to said outer pipe sections, said floats enabling the outer pipe sections and the enclosed support members and inner pipe sections to float on the body of water at a level most suited for skimming the layer of oil;
   a first suction pump coupled to an end of said joined outer pipe sections, said first pump acting to draw a water and oil mixture into the interior of the joined outer pipe sections through the perforations therein; and
   a second suction pump coupled to an end of said coupled internal pipe sections, said second pump acting to draw primarily oil into the interior of said joined inner pipe sections through the perforations therein from the oil and water mixture drawn into the interior of the joined outer pipe sections.

13. The apparatus of claim 12, wherein each support member is a threaded shaft installed in diametrically opposed apertures within the outer pipe section and passing through diametrically opposed apertures and a threaded collar within the inner pipe section, the threads of said collar engaging those of said shaft, said shaft being rotatable to raise and lower the inner pipe section.

14. The system of claim 12, which further comprises a separator into which primarily oil drawn from said inner pipe sections is sent, said separator having at least one exit pipe through which water is removed from the oil and routed to a relatively unpolluted area of the body of water.

15. The apparatus of claim 12, wherein the water and oil mixture removed from the outer pipe by the first pump is returned to an area of the body of water where oil is yet to be recovered.

16. The apparatus of claim 12, wherein each inner pipe section is equipped with an external circumferential straight-cut gear, and each outer pipe section is equipped with a bell rotatable about the end thereof, said bell incorporating an internal circumferential straight-cut gear that meshes with the external gear on the inner pipe, so that as the bell is rotated about the outer pipe, the inner pipe also rotates.

17. The apparatus of claim 12, wherein the perforations in the outer pipe are evenly spaced, but of increasing size as their distance from the first pump increases, distance being measured along the joined outer pipe sections.

18. The apparatus of claim 12, wherein the perforations in the inner pipe are evenly spaced, but of increasing size as their distance from the second pump increases, distance being measured along the joined inner pipe sections.

19. The apparatus of claim 12, which further comprises a cable tautly coupled to each of the outer pipe sections.

20. The apparatus of claim 12, which further comprises a cable which interconnects each boom section.

* * * * *